US012511928B2

(12) United States Patent
Mikawa

(10) Patent No.: US 12,511,928 B2
(45) Date of Patent: Dec. 30, 2025

(54) INFORMATION PROCESSING APPARATUS, INFORMATION PROCESSING METHOD, AND COMPUTER-PROGRAM-READABLE RECORDING MEDIUM FOR ASSOCIATING AN IMAGE WITH IDENTIFICAITON INFORMATION

(71) Applicant: CANON KABUSHIKI KAISHA, Tokyo (JP)

(72) Inventor: Chiaki Mikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 353 days.

(21) Appl. No.: 18/302,623

(22) Filed: Apr. 18, 2023

(65) Prior Publication Data

US 2023/0351793 A1  Nov. 2, 2023

(30) Foreign Application Priority Data

Apr. 27, 2022  (JP) .................. 2022-073358

(51) Int. Cl.
*G06V 40/10* (2022.01)
*G06V 10/75* (2022.01)
(Continued)

(52) U.S. Cl.
CPC .............. *G06V 40/10* (2022.01); *G06V 10/75* (2022.01); *G06V 40/50* (2022.01); *G16H 10/60* (2018.01); *G06V 2201/03* (2022.01)

(58) Field of Classification Search
CPC ........ G06V 40/10; G06V 10/75; G06V 40/50; G06V 2201/03; G16H 10/60; G16H 30/40;
(Continued)

(56) References Cited

U.S. PATENT DOCUMENTS

2005/0057684 A1\* 3/2005 Tamakoshi ............. A61B 90/36
348/375
2013/0136330 A1\* 5/2013 Takagi ................... G16H 40/20
382/131
(Continued)

FOREIGN PATENT DOCUMENTS

JP   2009020547 A   1/2009
JP   2016042258 A   3/2016

*Primary Examiner* — Juan M Guillermety
(74) *Attorney, Agent, or Firm* — Canon U.S.A., Inc. IP Division

(57) ABSTRACT

An information processing apparatus acquires a plurality of images related to a target person who receives a service and image information added to each of the plurality of images, extracts an identification image including a subject to identify the target person by analyzing the plurality of images, acquires, based on the image information, image capturing information of each of the plurality of images, acquires, based on identification information corresponding to the identification image, service information regarding a service received by a target person associated with the identification information, performs matching between the image capturing information of a target image and the service information, the target image different from the identification image from among the plurality of images, and controls, based on a result of the matching, the identification information to be stored in association with each of the target images.

15 Claims, 9 Drawing Sheets

(51) Int. Cl.
　　*G06V 40/50*　　　(2022.01)
　　*G16H 10/60*　　　(2018.01)
(58) Field of Classification Search
　　CPC ........ G16H 50/20; G16H 15/00; G16H 30/20;
　　　　　　　　　　　　　　　　　　　　　　G16H 40/20
　　See application file for complete search history.

(56) References Cited

U.S. PATENT DOCUMENTS

| | | | |
|---|---|---|---|
| 2014/0236629 A1* | 8/2014 | Kim | A61G 7/05 |
| | | | 705/3 |
| 2019/0272640 A1* | 9/2019 | Sugahara | G06V 10/776 |
| 2021/0158932 A1* | 5/2021 | Karanam | G06V 40/10 |
| 2021/0265048 A1* | 8/2021 | Ekker | G16H 30/20 |
| 2022/0130521 A1* | 4/2022 | P | A61B 5/7425 |
| 2022/0208381 A1* | 6/2022 | Hirakawa | G16H 30/40 |
| 2022/0215552 A1* | 7/2022 | Rohani | G06V 40/10 |
| 2022/0279111 A1* | 9/2022 | Li | G06V 40/172 |

* cited by examiner

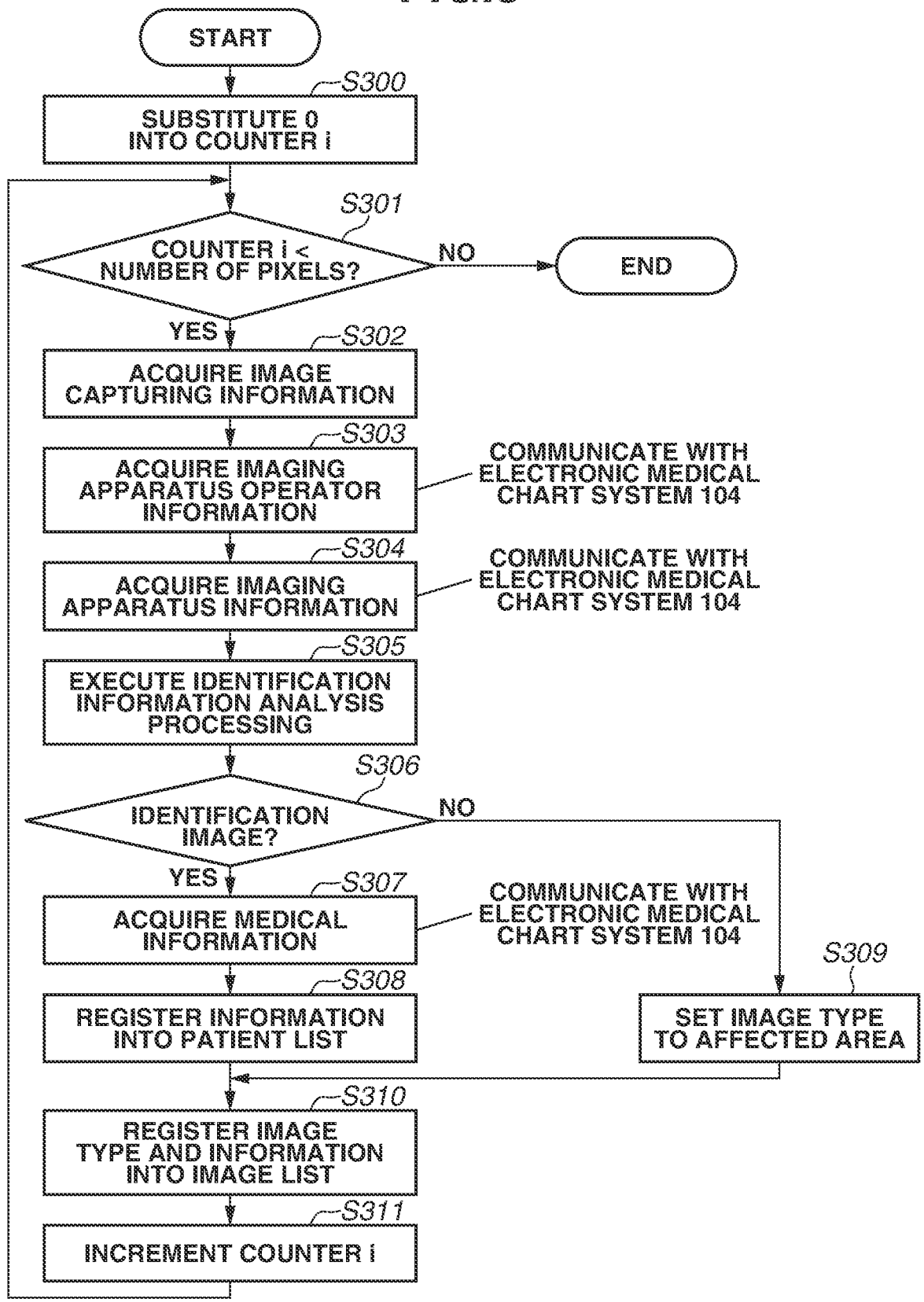

FIG.4

| NO. | IMAGE TYPE | IMAGE CAPTURING TIME | IMAGING APPARATUS OPERATOR ID | IMAGING APPARATUS OPERATOR DEPARTMENT | IMAGING APPARATUS ID | PATIENT ID | PATIENT NAME | START | END | DIAGNOSIS AND TREATMENT DEPARTMENT | ESTIMATED PATIENT ID | MISMATCH CONDITION |
|---|---|---|---|---|---|---|---|---|---|---|---|---|
| 1 | IDENTIFICATION | 13:19 | A | INTRAORAL SURGERY | 005 | 101 | TARO YAMADA | 13:10 | 13:30 | INTRAORAL SURGERY | — | |
| 2 | AFFECTED AREA | 13:20 | A | INTRAORAL SURGERY | 005 | | | | | | UNKNOWN | |
| 3 | AFFECTED AREA | 13:21 | A | INTRAORAL SURGERY | 005 | | | | | | UNKNOWN | |
| 4 | AFFECTED AREA | 13:29 | A | INTRAORAL SURGERY | 001 | | | | | | UNKNOWN | |
| 5 | AFFECTED AREA | 14:00 | B | DENTISTRY | 004 | | | | | | UNKNOWN | |
| 6 | IDENTIFICATION | 14:01 | B | DENTISTRY | 004 | 178 | HANAKO TANAKA | 13:50 | 14:15 | DENTISTRY | — | |
| 7 | AFFECTED AREA | 14:10 | B | DENTISTRY | 004 | | | | | | UNKNOWN | |
| 8 | AFFECTED AREA | 14:12 | A | INTRAORAL SURGERY | 001 | | | | | | UNKNOWN | |
| 9 | AFFECTED AREA | 14:26 | A | INTRAORAL SURGERY | 001 | | | | | | UNKNOWN | |
| 10 | AFFECTED AREA | 14:31 | C | DERMATOLOGY | 006 | | | | | | UNKNOWN | |
| 11 | AFFECTED AREA | 14:32 | C | DERMATOLOGY | 006 | | | | | | UNKNOWN | |
| 12 | IDENTIFICATION | 14:33 | C | DERMATOLOGY | 006 | 230 | JIRO SUZUKI | 14:25 | 14:35 | DERMATOLOGY | — | |
| 13 | AFFECTED AREA | 14:10 | C | DERMATOLOGY | 006 | | | | | | UNKNOWN | |
| 14 | AFFECTED AREA | 15:01 | A | INTRAORAL SURGERY | 005 | | | | | | UNKNOWN | |
| 15 | AFFECTED AREA | 15:02 | A | INTRAORAL SURGERY | 005 | | | | | | UNKNOWN | |
| 16 | IDENTIFICATION | 15:10 | E | DERMATOLOGY | 006 | 098 | SABURO TAKAHASHI | 15:00 | 15:15 | DERMATOLOGY | — | |
| 17 | AFFECTED AREA | 15:11 | E | DERMATOLOGY | 006 | | | | | | UNKNOWN | |
| 18 | AFFECTED AREA | 15:12 | C | DERMATOLOGY | 006 | | | | | | UNKNOWN | |
| 19 | AFFECTED AREA | 15:14 | C | DERMATOLOGY | 006 | | | | | | UNKNOWN | |
| 20 | AFFECTED AREA | 15:23 | E | DERMATOLOGY | 006 | | | | | | UNKNOWN | |

FIG.5

| | 501 | 502 | 503 | 504 | 505 | 506 | 507 | 508 | 509 | 510 | 511 |
|---|---|---|---|---|---|---|---|---|---|---|---|
| | NO. | PATIENT ID | PATIENT NAME | IMAGE CAPTURING TIME | START | END | DIAGNOSIS AND TREATMENT DEPARTMENT | IMAGING APPARATUS OPERATOR ID | IMAGING APPARATUS OPERATOR DEPARTMENT | IMAGING APPARATUS ID | PROCESSING STATUS |
| 512 | 1 | 211 | ROKUTA YOKOHAMA | 9:05 | 9:00 | 9:30 | INTRAORAL SURGERY | A | INTRAORAL SURGERY | 001 | PROCESSED |
| 513 | 2 | 042 | SADAKO YURAKUCHO | 10:15 | 10:00 | 10:30 | DENTISTRY | G | DENTISTRY | 004 | PROCESSED |
| 514 | 3 | 101 | TARO YAMADA | 13:19 | 13:10 | 13:30 | INTRAORAL SURGERY | A | INTRAORAL SURGERY | 005 | UNPROCESSED |
| 515 | 4 | 178 | HANAKO TANAKA | 14:01 | 13:50 | 14:15 | DENTISTRY | B | DENTISTRY | 004 | UNPROCESSED |
| 516 | 5 | 230 | JIRO SUZUKI | 14:33 | 14:05 | 14:35 | DERMATOLOGY | C | DERMATOLOGY | 006 | UNPROCESSED |
| 517 | 6 | 098 | SABURO TAKAHASHI | 15:10 | 15:00 | 15:15 | DERMATOLOGY | E | DERMATOLOGY | 006 | UNPROCESSED |
| 518 | 7 | 410 | YUKO KAMATA | 15:42 | 15:10 | 15:45 | PEDIATRICS | F | PEDIATRICS | 002 | UNPROCESSED |
| 519 | 8 | 568 | SHIRO SHIMOMARUKO | 16:15 | 16:00 | 16:30 | OBSTETRICS AND GYNECOLOGY | G | GENERAL INTERNAL MEDICINE | 010 | UNPROCESSED |

FIG. 7

| NO. | IMAGE TYPE | IMAGE CAPTURING TIME | IMAGING APPARATUS OPERATOR ID | IMAGING APPARATUS OPERATOR DEPARTMENT | IMAGING APPARATUS ID | PATIENT ID | PATIENT NAME | START | END | DIAGNOSIS AND TREATMENT DEPARTMENT | ESTIMATED PATIENT ID | MISMATCH CONDITION |
|---|---|---|---|---|---|---|---|---|---|---|---|---|
| 1 | IDENTIFICATION | 13:19 | A | INTRAORAL SURGERY | 005 | 101 | TARO YAMADA | 13:10 | 13:30 | INTRAORAL SURGERY | — | |
| 2 | AFFECTED AREA | 13:20 | A | INTRAORAL SURGERY | 005 | | | | | | 101 | |
| 3 | AFFECTED AREA | 13:21 | A | INTRAORAL SURGERY | 005 | | | | | | 101 | |
| 4 | AFFECTED AREA | 13:29 | A | INTRAORAL SURGERY | 001 | | | | | | UNKNOWN | CAMERA |
| 5 | AFFECTED AREA | 14:00 | B | DENTISTRY | 004 | | | | | | 178 | |
| 6 | IDENTIFICATION | 14:01 | B | DENTISTRY | 004 | 178 | HANAKO TANAKA | 13:50 | 14:15 | DENTISTRY | — | |
| 7 | AFFECTED AREA | 14:10 | B | DENTISTRY | 004 | | | | | | 178 | |
| 8 | AFFECTED AREA | 14:12 | A | INTRAORAL SURGERY | 001 | | | | | | UNKNOWN | DIAGNOSIS AND TREATMENT DEPARTMENT |
| 9 | AFFECTED AREA | 14:26 | A | INTRAORAL SURGERY | 001 | | | | | | UNKNOWN | DIAGNOSIS AND TREATMENT DEPARTMENT |
| 10 | AFFECTED AREA | 14:31 | C | DERMATOLOGY | 006 | | | | | | 230 | |
| 11 | AFFECTED AREA | 14:32 | C | DERMATOLOGY | 006 | | | | | | 230 | |
| 12 | IDENTIFICATION | 14:33 | C | DERMATOLOGY | 006 | 230 | JIRO SUZUKI | 14:25 | 14:35 | DERMATOLOGY | — | |
| 13 | AFFECTED AREA | 14:10 | C | DERMATOLOGY | 006 | | | | | | UNKNOWN | TIME |
| 14 | AFFECTED AREA | 15:01 | A | INTRAORAL SURGERY | 005 | | | | | | UNKNOWN | DIAGNOSIS AND TREATMENT DEPARTMENT |
| 15 | AFFECTED AREA | 15:02 | A | INTRAORAL SURGERY | 005 | | | | | | UNKNOWN | DIAGNOSIS AND TREATMENT DEPARTMENT |
| 16 | IDENTIFICATION | 15:10 | E | DERMATOLOGY | 006 | 098 | SABURO TAKAHASHI | 15:00 | 15:15 | DERMATOLOGY | — | |
| 17 | AFFECTED AREA | 15:11 | E | DERMATOLOGY | 006 | | | | | | 098 | |
| 18 | AFFECTED AREA | 15:12 | C | DERMATOLOGY | 006 | | | | | | 098 | |
| 19 | AFFECTED AREA | 15:14 | C | DERMATOLOGY | 006 | | | | | | 098 | |
| 20 | AFFECTED AREA | 15:23 | E | DERMATOLOGY | 006 | | | | | | UNKNOWN | TIME |

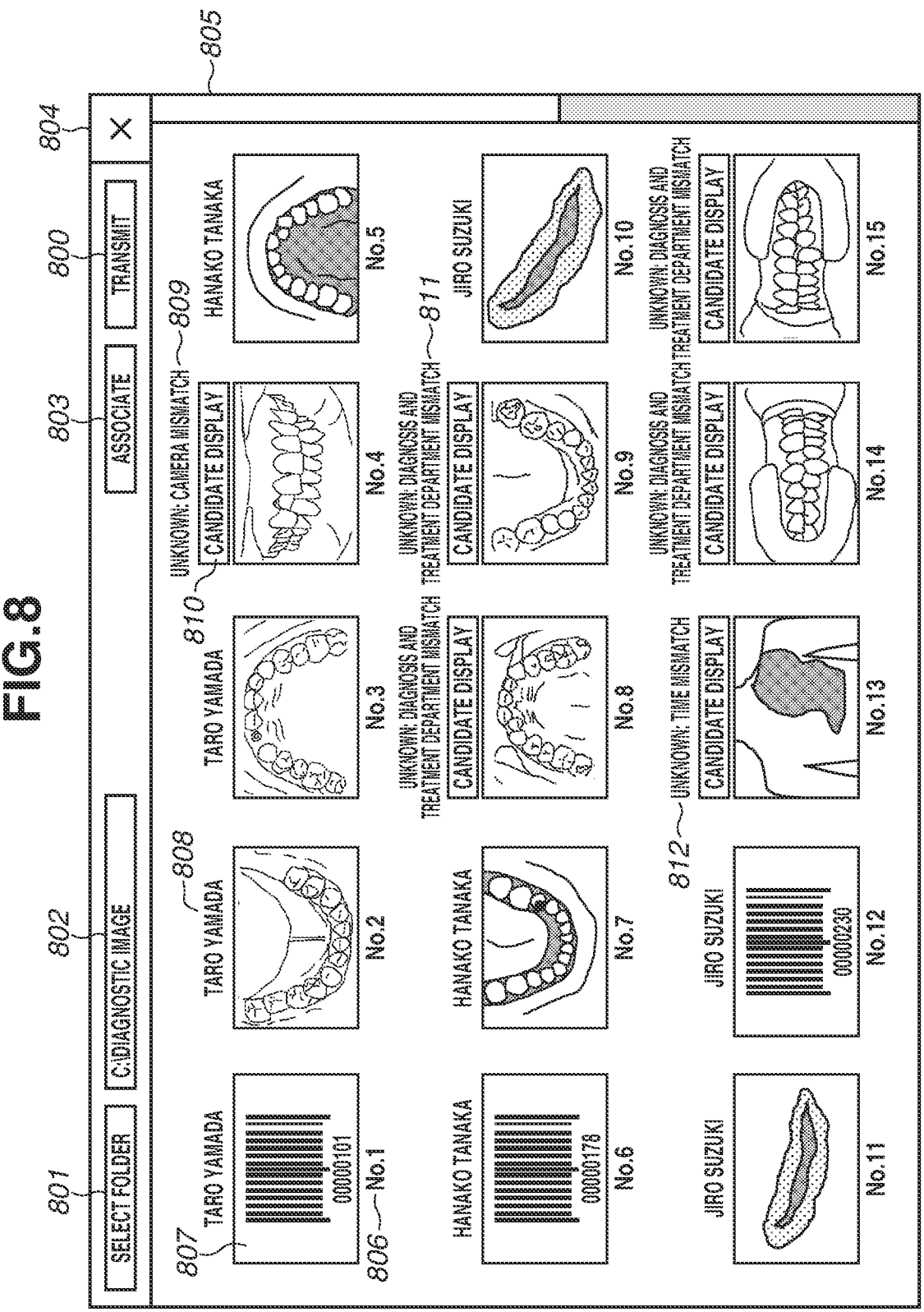

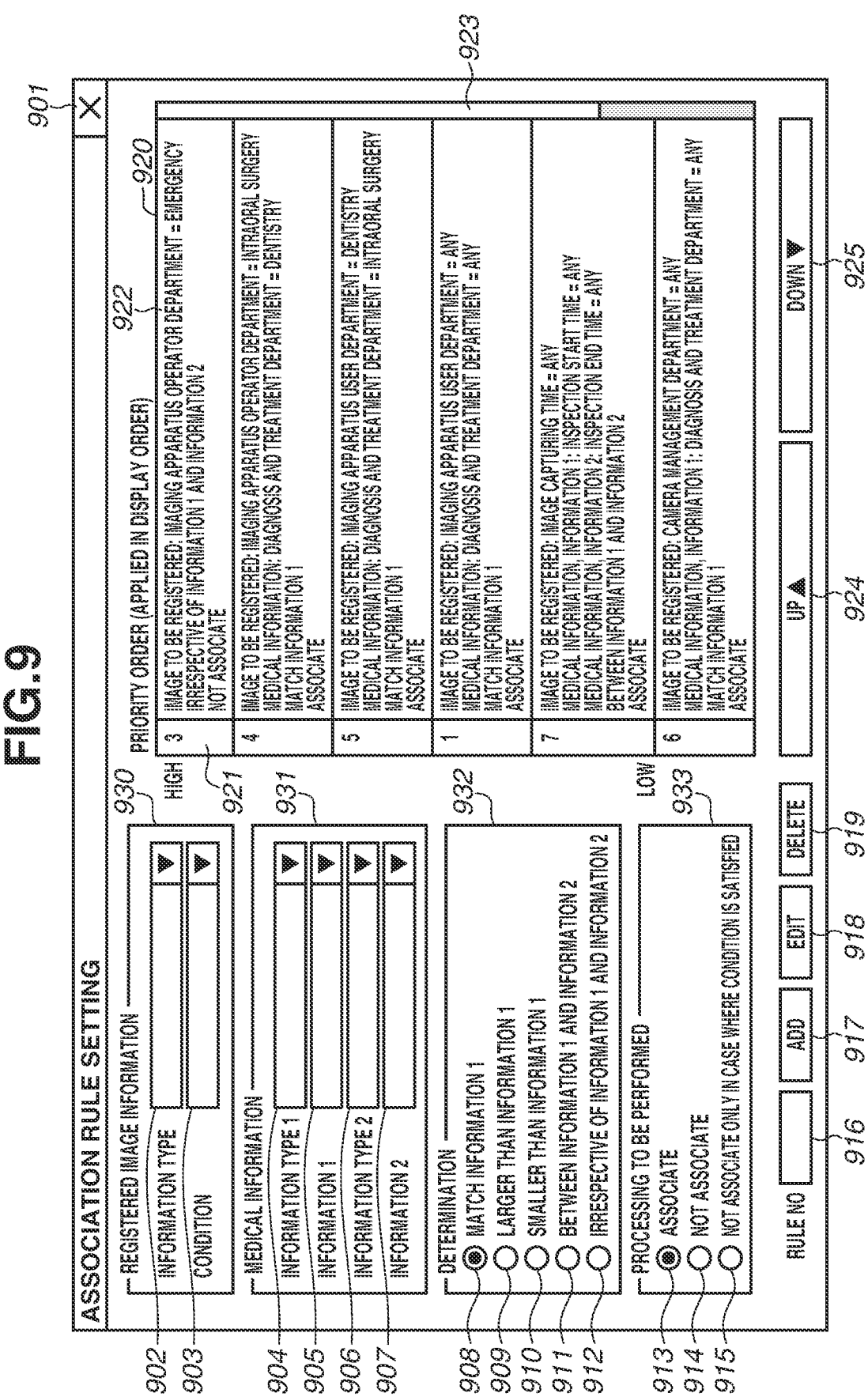

INFORMATION PROCESSING APPARATUS, INFORMATION PROCESSING METHOD, AND COMPUTER-PROGRAM-READABLE RECORDING MEDIUM FOR ASSOCIATING AN IMAGE WITH IDENTIFICAITON INFORMATION

BACKGROUND

Field

The present disclosure relates to an image management technique.

Description of the Related Art

A technique of registering an image of a patient in association with an electronic medical chart of the patient has been utilized. Japanese Patent Application Laid-Open No. 2009-20547 discusses a technique of simultaneously importing content information and identification information from a paper medium on which the content information and the identification information are printed, and registering the content information in association with the identification information of a patient. Japanese Patent Application Laid-Open No. 2016-42258 discusses a technique of identifying an image including identification information of a patient as a subject, from among a plurality of imported images, and registering an image selected from among images following the identified image in association with identification information of the patient.

In the technique discussed in Japanese Patent Application Laid-Open No. 2009-20547, however, in a case where content information and identification information are imported as separate images in random order, content information and identification information of the patient cannot be correctly associated. In the technique discussed in Japanese Patent Application Laid-Open No. 2016-42258, in a case where the order of image capturing is not uniquely determined, an imported image and identification information of the patient cannot be correctly associated. Thus, an image of a patient has been sometimes associated with wrong patient information.

SUMMARY OF THE INVENTION

In view of the foregoing, the present disclosure is directed to preventing an image of a target person from being associated with identification information of a wrong target person.

According to an aspect of the present disclosure, an information processing apparatus includes one or more memories, and one or more processors in communication with the one or more memories, wherein the one or more processors and the one or more memories are configured to, acquire a plurality of images related to a target person who receives a service and image information added to each of the plurality of images, extract an identification image including a subject to identify the target person by analyzing the plurality of images, acquire, based on the image information, image capturing information of each of the plurality of images, acquire, based on identification information corresponding to the identification image, service information regarding a service received by a target person associated with the identification information, perform matching between the image capturing information of a target image and the service information, the target image different from the identification image from among the plurality of images, and control, based on a result of the matching, the identification information to be stored in association with each of the target images.

Further features will become apparent from the following description of exemplary embodiments with reference to the attached drawings.

BRIEF DESCRIPTION OF THE DRAWINGS

FIG. 3 is a flowchart illustrating image registration processing.

FIG. 4 is a diagram illustrating an example of an image list.

FIG. 5 is a diagram illustrating an example of a patient list.

FIG. 7 is a diagram illustrating an image list obtained by the association processing.

FIG. 8 is a diagram illustrating an example of a screen displaying a correspondence relationship between patients and affected area images.

FIG. 9 is a diagram illustrating an example of a setting screen of an association rule.

DESCRIPTION OF THE EMBODIMENTS

Embodiments of the present disclosure will be described with reference to the drawings. The following embodiments, however, are not intended to be limiting, and not all the combinations of the features described in the present embodiments are essential as solutions to the problem disclosed in the present disclosure. In the following description, same components are denoted with the same reference number. Each of the embodiments of the present disclosure described below can be implemented solely or as a combination of a plurality of the embodiments or features thereof where necessary or where the combination of elements or features from individual embodiments in a single embodiment is beneficial.

<Medical System>

Figure 1:
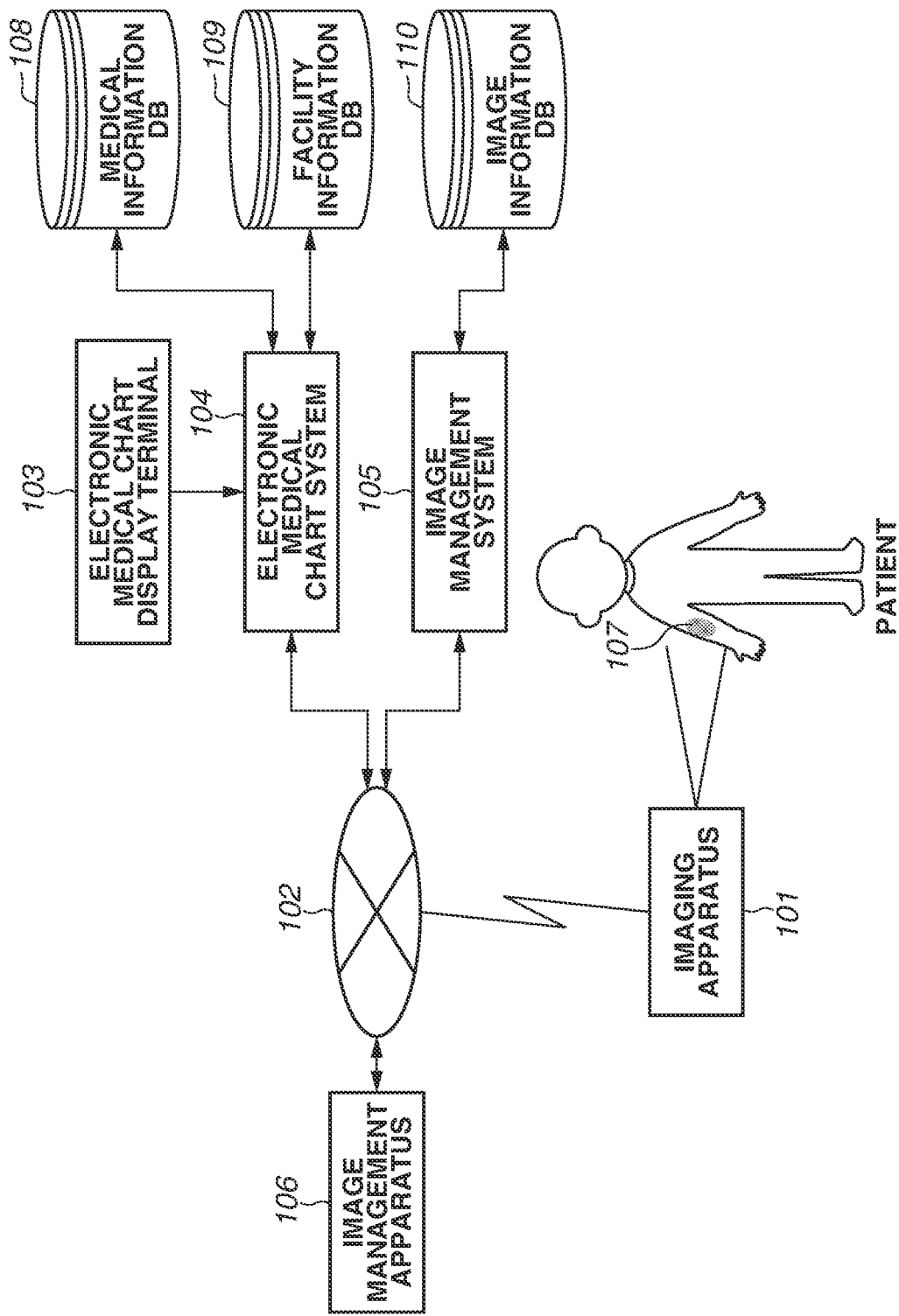
FIG. 1 is a diagram illustrating an entire configuration example of a medical system.

FIG. 1 illustrates an entire configuration example of a medical system according to a first exemplary embodiment. The medical system is a system for managing information regarding a patient. The patient is an example of a target person who receives a medical service. As illustrated in FIG. 1, the medical system includes an imaging apparatus 101, an electronic medical chart system 104, an image management system 105, and an image management apparatus 106. These apparatuses are connected to each other via a network 102. The image management apparatus 106 controls execution of various types of processing that is performed by an information processing apparatus (not illustrated).

The imaging apparatus 101 connects to the network 102 in response to an imaging apparatus operator turning ON the power, and communicates with another apparatus (not illustrated) on the network 102. The imaging apparatus 101 maintains the communication-executable state until the power is turned OFF. In the present exemplary embodiment, the imaging apparatus 101 is a portable compact camera, such as a commercially available digital camera, and includes a display device for displaying captured images, and an input-output device for inputting various operations, such as a selection of information regarding the imaging apparatus 101 or information regarding the imaging apparatus operator. The imaging apparatus 101 generates visible light image data by capturing an image of an affected area 107 of a patient or an identification object, such as a one-dimensional (1D) code in which a patient ID is embedded. In the following description, an image captured by the imaging apparatus 101 will be described as visible light image data. The imaging apparatus 101 adds header information to an image, and transmits the image to the image management apparatus 106 via the network 102.

The image management apparatus 106 receives an image from the imaging apparatus 101. Header information is added to the image. The header information is an example of image information. The header information contains image capturing information. The image capturing information contains an image capturing time, imaging apparatus operator information, and imaging apparatus information. The image management apparatus 106 analyzes an image received from the imaging apparatus 101, and determines whether the image is an affected area image or an identification image. The identification image is an image including an identification object, such as a 1D code or a two-dimensional (2D) code in which a patient ID is stored. The affected area image is an image including the affected area 107 of a patient. The affected area image is a patient image to be diagnosed, and is an example of a target image obtained by capturing an image of a target person.

The electronic medical chart system 104 is connected with an electronic medical chart display terminal 103 via a High-Definition Multimedia Interface (HDMI®) cable such that communication is executable. In response to a request from the electronic medical chart display terminal 103, the electronic medical chart system 104 communicates with the image management apparatus 106 and the image management system 105, and performs transmission and reception of data in electronic medical chart generation and edit processing. The electronic medical chart display terminal 103 communicates with the electronic medical chart system 104, and displays an electronic medical chart, receives entry made when an electronic medical chart is generated, and performs information addition processing on a displayed image.

The electronic medical chart system 104 is also connected with a medical information database (DB) 108 such that communication is executable. The medical information DB 108 stores medical information of a patient in the medical system. In response to a request from another apparatus on the network 102, the electronic medical chart system 104 acquires appropriate medical information from the medical information DB 108. The medical information contains patient information, a medical care start time, a medical care end time, a visited diagnosis and treatment department, a position in a body of a past injury or disease, and a diagnosis result. The patient information contains a patient ID, a name, a gender, a birth date, a medical history, and allergy information of a patient. The patient ID is an example of identification information of a patient. The medical information is an example of medical service information in the medical system. The medical information DB 108 can be stored in a storage device inside the electronic medical chart system 104.

In response to an acquisition request of information regarding a patient from the image management apparatus 106, the electronic medical chart system 104 acquires a series of information pieces regarding the patient from the medical information DB 108 using a patient ID included in the acquisition request as a key. In the present exemplary embodiment, in response to a request from the image management apparatus 106, the electronic medical chart system 104 searches the medical information DB 108 for medical information using a patient ID and date and time when diagnosis and treatment have been performed, and acquires an applicable patient and information regarding diagnosis and treatment that have been performed at the date and time. The electronic medical chart system 104 transmits the acquired information to the image management apparatus 106.

The electronic medical chart system 104 is also connected with a facility information DB 109 such that communication is executable. The facility information DB 109 stores information regarding a medical staff and an apparatus. In response to a request from another apparatus on the network 102, the electronic medical chart system 104 acquires applicable imaging apparatus operator information and imaging apparatus information from the facility information DB 109. The imaging apparatus operator information contains an imaging apparatus operator ID, an imaging apparatus operator job category, an imaging apparatus operator name, and an imaging apparatus operator department. The imaging apparatus operator department indicates a diagnosis and treatment department (hospital department) to which the imaging apparatus operator belongs. The imaging apparatus information contains an imaging apparatus ID, an imaging apparatus management department, an imaging apparatus manager, and an imaging apparatus model name.

The facility information DB 109 can be stored in a storage device inside the electronic medical chart system 104. The electronic medical chart system 104 searches the facility information DB 109 for applicable imaging apparatus operator information using an imaging apparatus operator ID as a key, and searches the facility information DB 109 for applicable imaging apparatus information using an imaging apparatus ID as a key. The electronic medical chart system 104 transmits retrieved information to a request source.

The image management system 105 is connected with an image information DB 110 such that communication is executable. The image information DB 110 stores an image and information regarding an image. The image management system 105 receives an image captured by the imaging apparatus 101, via the image management apparatus 106, and stores the received image into the image information DB 110 in a state in which a patient ID and image capturing date and time are associated. The image information DB 110 can be stored in a storage device inside the image management system 105. In a case where an image acquisition request is issued from the electronic medical chart system 104 or the image management apparatus 106, the image management system 105 transmits an image applicable to a designated condition to a request source.

The affected area 107 of a patient is a diagnosis and treatment target in the medical system. In some cases, a state of an injury or a disease is diagnosed based on the appearance of a symptom of a whole body, and in other cases, a state of an injury or a disease is diagnosed based on the appearance of a symptom of a part of a body. In a case where a state of an injury or a disease is diagnosed based on the appearance of a symptom of a whole body, a large range, such as a head, a body trunk, a lower extremity, or an upper extremity, is set as a diagnosis and treatment target.

Information to be recorded is not limited to an injury or a disease, and a case where the state of a region of a body that is to be observed, such as the inside of a mouth cavity, is recorded is also included. For example, a teeth alignment state or a teeth exfoliation state can also be recorded.

An HDMI® cable or a universal serial bus (USB) are examples of communication interfaces that can be used by the components of the above-described medical system to communicate with each other. These communication interfaces are not seen to be limiting, and any communication interface that would enable practice of the present embodiment is applicable.

In the medical system of the present exemplary embodiment, as illustrated in FIG. 1, the imaging apparatus 101, the electronic medical chart display terminal 103, the electronic medical chart system 104, the image management system 105, and the image management apparatus 106 are described as separate components of the medical system. In another exemplary embodiment, functions of two or more of these components can be implemented by one component. For example, the electronic medical chart display terminal 103 can include a function of the imaging apparatus 101.

<Configuration of Image Management Apparatus>

Figure 2:
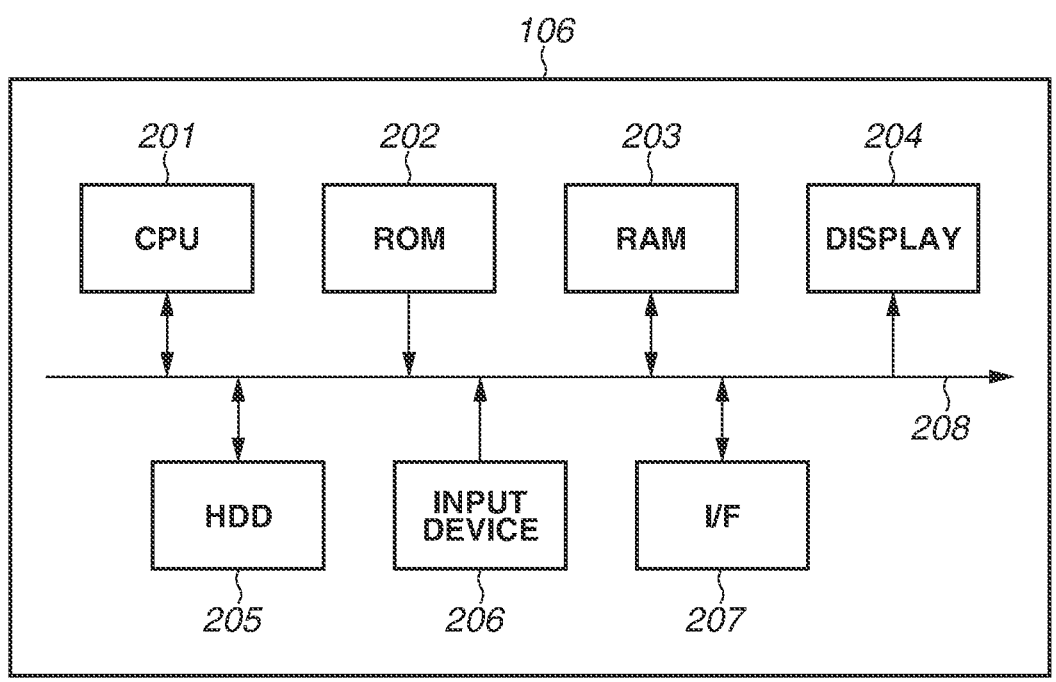
FIG. 2 is a diagram illustrating a hardware configuration example of an image management apparatus.

FIG. 2 illustrates a hardware configuration example of the image management apparatus 106. The image management apparatus 106 includes a central processing unit (CPU) 201, a read-only memory (ROM) 202, a random access memory (RAM) 203, a display 204, a hard disk drive (HDD) 205, an input device 206, and an interface (I/F) 207, where these components are connected via a bus 208. The CPU 201 controls operations of the image management apparatus 106. The ROM 202 stores programs and various types of data. The CPU 201 executes programs stored in the ROM 202 to achieve processing of various procedures and various functions of the image management apparatus 106 that are described below.

The RAM 203 is used as a main memory and a temporary storage area, such as a working memory. The HDD 205 stores images, an image list (FIGS. 4 and 7) storing information regarding images, and a patient list (FIG. 5) storing information regarding a patient that is associated with an identification image. Under control of the CPU 201, the display 204 displays various processing results and a user interface (UI) screen to be operated by an operator. The input device 206 inputs operation information from the operator. The CPU 201 controls the I/F 207 to perform data transmission and reception with another apparatus on the network 102.

<Image Registration Processing>

FIG. 3 is a flowchart illustrating image registration processing executed by the image management apparatus 106. The image registration processing is processing to determine whether a processing target image is an affected area image or an identification image and registering the processing target image. The processing of the flowchart can be started in response to an instruction from the operator or can be started at a predetermined timing.

Before starting the processing of the flowchart, the CPU 201 acquires a processing target image from the imaging apparatus 101.

In step S300, the CPU 201 substitutes a default value 0 into a counter i for processing all the processing target images.

In step S301, the CPU 201 determines whether the counter i indicates a value less than the number of processing target images. In a case where the CPU 201 determines that the counter i indicates less than the number of processing target images (YES in step S301), the processing proceeds to step S302. In a case where the CPU 201 determines that the counter i indicates greater than or equal to the number of processing target images (NO in step S301), the CPU 201 determines that a series of processes have been performed on all of the processing target images, and ends the processing of the flowchart.

In step S302, the CPU 201 acquires image capturing information of an i-th image. The image capturing information is acquired from header information of the i-th image. The image capturing information contains an image capturing time, an imaging apparatus operator ID, and an imaging apparatus ID. The CPU 201 stores the acquired image capturing information into the RAM 203.

In step S303, the CPU 201 communicates with the electronic medical chart system 104 via the network 102, and acquires imaging apparatus operator information using the imaging apparatus operator ID acquired in step S302, as a key. The imaging apparatus operator information contains the imaging apparatus operator department. The CPU 201 stores the acquired imaging apparatus operator information into the RAM 203.

In step S304, the CPU 201 communicates with the electronic medical chart system 104 via the network 102, and acquires imaging apparatus information using the imaging apparatus ID acquired in step S302 as a key. The CPU 201 stores the acquired imaging apparatus information in the RAM 203.

In step S305, the CPU 201 performs identification information analysis processing on the i-th image. In the present exemplary embodiment, the identification information analysis processing is 1D code reading processing.

In step S306, the CPU 201 determines whether the i-th image is an identification image, based on a result of the identification information analysis processing. In a case where 1D code reading processing succeeds, the CPU 201 determines that the i-th image is an identification image (YES in step S306), and the processing proceeds to step S307. In a case where 1D code reading processing fails, the CPU 201 determines that the i-th image is an affected area image (NO in step S306), and the processing proceeds to step S309. This processing enables the CPU 201 to determine whether a processing target image is an identification image or an affected area image.

In a case where the CPU 201 determines that the processing target image is an identification image (YES in step S306), the CPU 201 sets an image type to "identification", and stores a read patient ID in the RAM 203.

In step S307, the CPU 201 communicates with the electronic medical chart system 104 via the network 102, and acquires, using the patient ID read in step S305 and the image capturing time acquired in step S302 as a key, medical information regarding diagnosis and treatment performed at a corresponding time on a corresponding patient. Specifically, the CPU 201 acquires medical information containing a patient ID identical to the read patient ID, and an image capturing time falling between a medical care start time and a medical care end time. The medical information contains patient information (patient name), a medical care start time, a medical care end time, and a visited diagnosis and treatment department.

The CPU 201 stores the acquired medical information in the RAM 203.

In step S308, the CPU 201 registers the information to be stored in the RAM 203 as a last record of a patient list (FIG. 5) stored in the HDD 205. The processing then proceeds to step S310.

In step S309, the CPU 201 sets an image type to an "affected area".

In step S310, the CPU 201 registers the set image type and various types of information that is stored in the RAM 203 as a last record of an image list (FIG. 4) stored in the HDD 205.

In step S311, the CPU 201 deletes information regarding the i-th image from the RAM 203 and increments the counter i. The processing then returns to step S301.

According to the above-described image registration processing, it is determined whether a processing target image is an affected area image or an identification image, and image capturing information of an affected area image, image capturing information of an identification image, and medical information associated with a patient ID obtained from the identification image are acquired, and these pieces of information are stored for each image. Accordingly, information necessary for association processing (FIG. 6 described below) of a patient and an affected area image, which will be described below, can be managed for each image. In the image registration processing, only information necessary for the association processing in FIG. 6 can be acquired. For example, in a case where only an imaging apparatus ID is required as imaging apparatus information, the processing in step S305 can be skipped.

<Image List>

FIG. 4 is a diagram illustrating an example of the image list holding information regarding an image. In the present exemplary embodiment, the image list in FIG. 4 is stored in the HDD 205 of the image management apparatus 106.

In step S310 of FIG. 3, the record of each image is added and registered into the image list. Records 414 to 433 registered in the image list each contain information regarding an image identification number 401, an image type 402, an image capturing time 403, an imaging apparatus operator ID 404, an imaging apparatus operator department 405, and an imaging apparatus ID 406. The records 414 to 433 also each contain information regarding a patient ID 407, a patient name 408, a medical care start time 409, a medical care end time 410, a diagnosis and treatment department 411, an estimated patient ID 412, and a mismatch condition 413.

The image identification number 401 includes an identification number for uniquely identifying a processing target image. In the present exemplary embodiment, an identification number is allocated in the registration order of images. The image type 402 includes, in a case where the processing target image is determined to be an identification image, "identification", and in a case where the processing target image is determined to be an affected area image, includes "affected area". The image capturing time 403 includes the image capturing time contained in the image capturing information acquired in step S302. The imaging apparatus operator ID 404 includes the imaging apparatus operator ID contained in the image capturing information acquired in step S302. The imaging apparatus operator department 405 includes the department of the imaging apparatus operator that is contained in the imaging apparatus operator information acquired in step S303. The imaging apparatus ID 406 includes the imaging apparatus ID contained in the image capturing information acquired in step S302.

In a case where it is determined that the processing target image is an identification image, information is also registered in the patient ID 407, the patient name 408, the medical care start time 409, the medical care end time 410, and the diagnosis and treatment department 411. The patient ID 407 includes the patient ID read in step S305. The patient name 408 includes the patient name contained in the medical information acquired in step S307. The medical care start time 409 includes the medical care start time contained in the medical information acquired in step S307. The medical care end time 410 includes the medical care end time contained in the medical information acquired in step S307. The diagnosis and treatment department 411 includes the diagnosis and treatment department contained in the medical information acquired in step S307. As illustrated in FIG. 4, the records 414, 419, 425, and 429 with the image type 402 storing "identification" have information in the patient ID 407, the patient name 408, the medical care start time 409, the medical care end time 410, and the diagnosis and treatment department 411.

Figure 6:
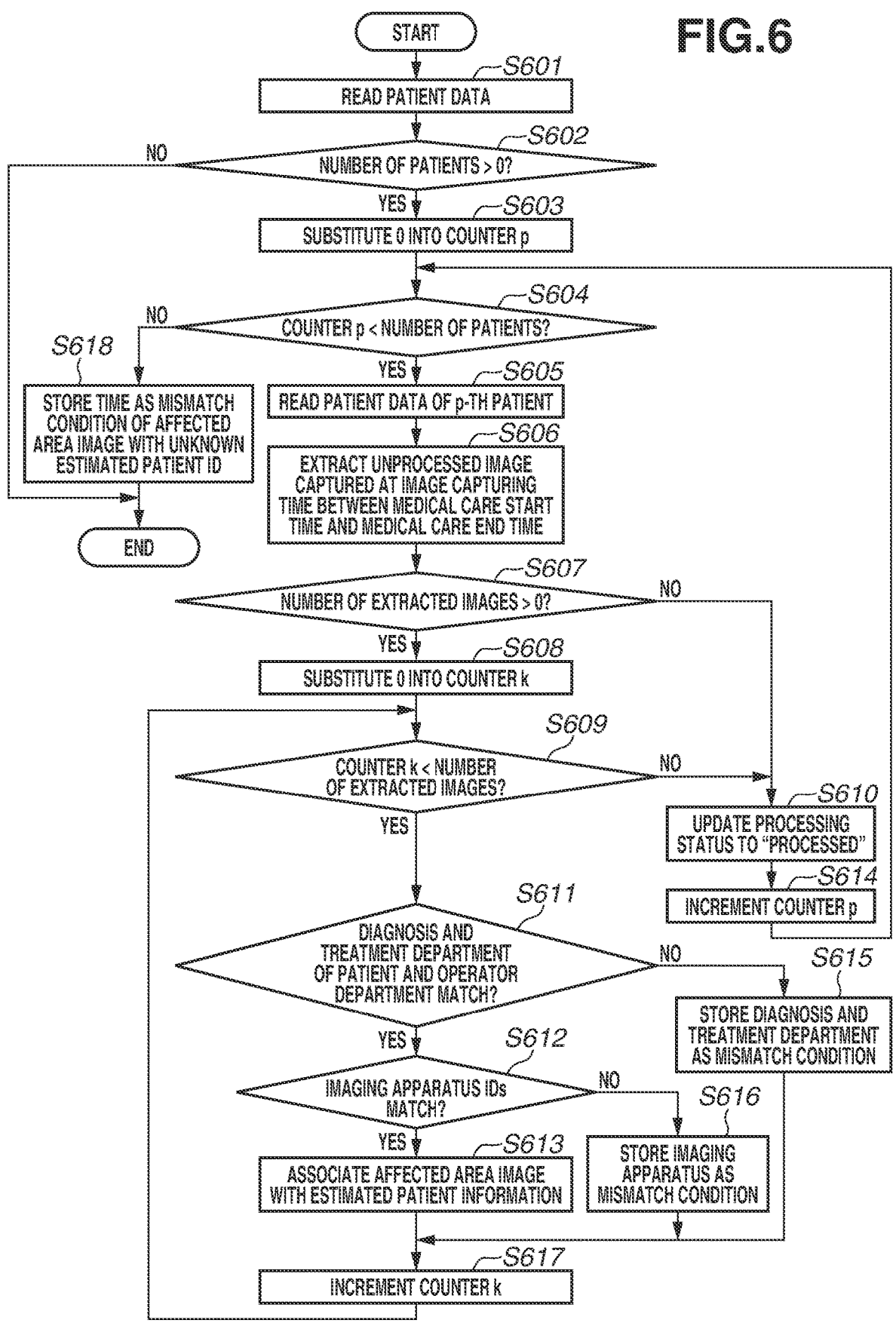
FIG. 6 is a flowchart illustrating association processing of a patient and an affected area image.

In a case where it is determined that the processing target image is an affected area image, information is registered in the estimated patient ID 412 and the mismatch condition 413 by the association processing in FIG. 6. In the estimated patient ID 412, "unknown" is stored as a default value, and in a case where a patient is estimated in the association processing in FIG. 6, a patient ID of the estimated patient is stored. In a case where a patient cannot be estimated in the association processing in FIG. 6, an item that is a cause of the mismatch is stored in the mismatch condition 413.

Information to be registered in the image list in FIG. 4 can be limited to information to be used for a matching in the association processing in FIG. 6 from among various types of information acquired in the image registration processing in FIG. 3. In another exemplary embodiment, information to be registered in the image list in FIG. 4 can be all of the various types of information acquired in the image registration processing in FIG. 3. For example, in a case of the matching in FIG. 6, the imaging apparatus operator ID 404 not to be used for the matching can be skipped from the registering into the image list. In another example, an imaging apparatus management department or an imaging apparatus model name can also be registered into the image list.

<Patient List>

FIG. 5 is a diagram illustrating an example of a patient list holding information regarding a patient associated with an identification image. In the present exemplary embodiment, the patient list in FIG. 5 is stored in the HDD 205 of the image management apparatus 106. In step S308 of FIG. 3, the record is added and registered in the patient list for each identification image. Records 512 to 519 registered in the patient list each contain information regarding a patient number 501, a patient ID 502, a patient name 503, an image capturing time 504, a medical care start time 505, a medical care end time 506, and a diagnosis and treatment department 507. The records 512 to 519 each contain information regarding an imaging apparatus operator ID 508, an imaging apparatus operator department 509, an imaging apparatus ID 510, and a processing status 511.

The patient number 501 includes an identification number for sequentially performing the association processing in FIG. 6 on a processing target patient. The patient ID 502 is the same as the patient ID 407. The patient name 503 is the same as the patient name 408. The image capturing time 504 is the same as the image capturing time 403. The medical care start time 505 is the same as the medical care start time 409. The medical care end time 506 is the same as the medical care end time 410. The diagnosis and treatment department 507 is the same as the diagnosis and treatment department 411. The imaging apparatus operator ID 508 is the same as the imaging apparatus operator ID 404. The imaging apparatus operator department 509 is the same as the imaging apparatus operator department 405. The imaging apparatus ID 510 is the same as the imaging apparatus ID 406. The processing status 511 includes information indicating whether the association processing in FIG. 6 has been executed. The processing status 511 includes "unprocessed" as a default value, and when the association processing in FIG. 6 is executed, "unprocessed" is updated to "processed".

Information to be registered in the patient list in FIG. 5 can be limited to information to be used for the matching in the association processing in FIG. 6 from among various types of information acquired in the image registration processing in FIG. 3 as information regarding an identification image. In another exemplary embodiment, information to be registered in the patient list in FIG. 5 can be all of the various types of information acquired in the image registration processing in FIG. 3 as information regarding an identification image.

<Association Processing of Patient and Affected Area Image>

FIG. 6 is a flowchart illustrating the association processing that is executed by the image management apparatus 106. The association processing is processing of matching between information regarding an identification image and image capturing information of an affected area image, determining whether a matching result satisfies a condition of association, and associating a patient associated with the identification image and the affected area image based on the determination result. A processing target patient is a patient to be registered in the patient list in FIG. 5.

A processing target affected area image is an image with the image type 402 including an "affected area" from among images to be registered in the image list in FIG. 4. The processing of the flowchart can be started in response to an instruction from an operator or can be started at a predetermined timing.

In step S601, the CPU 201 extracts a processing target patient from unprocessed patients from among patients registered in the patient list in FIG. 5. Specifically, the CPU 201 reads, from the patient list in FIG. 5, information regarding a patient with the medical care end time 506 including a time earlier than a latest image capturing time 403. In the present example, the image capturing time 403 of the record 433 registered as a last record of the image list is "15:23". Thus, as a patient with the processing status 511 including "unprocessed" and the medical care end time 506 including a time earlier than "15:23", information regarding the records 514 to 517 (hereinafter, referred to as patient data pieces 514 to 517) is read.

In step S602, the CPU 201 determines whether the number of patients extracted in step S601 is greater than 0. In a case where the CPU 201 determines that the number of extracted patients is greater than 0 (YES in step S602), the processing proceeds to step S603. In a case where the CPU 201 determines that the number of extracted patients is 0 (NO in step S602), the CPU 201 determines that there is no processing target patient, and ends the processing of the flowchart.

In step S603, the CPU 201 substitutes 0 into a counter p for performing a series of processes on a processing target patient.

In step S604, the CPU 201 determines whether the counter p is a value less than the number of processing target patients. In a case where the CPU 201 determines that the counter p is a value less than the number of processing target patients (YES in step S604), the processing proceeds to step S605. In a case where the CPU 201 determines that the counter p is greater than or equal to the number of processing target patients (NO in step S604), the CPU 201 determines that the matching between affected area image and all processing target patients has been completed, and the processing proceeds to step S618.

In step S605, the CPU 201 reads information regarding a p-th patient from among the processing target patients.

In step S606, based on the information read in step S605, the CPU 201 extracts an unprocessed image captured during a medical care time period, during which the processing target patient has received medical care, from among affected area images registered in the image list in FIG. 4. Specifically, the CPU 201 extracts an image with the image type 402 including an "affected area", the image capturing time 403 falling between the medical care start time 505 and the medical care end time 506, and the estimated patient ID 412 including "unknown". The CPU 201 stores the image identification number 401 of the extracted image in the RAM 203. In the above-described processing, the image management apparatus 106 performs the matching between an image capturing time of an affected area image and a medical care time period during which a patient has received medical care. Based on the matching result, the image management apparatus 106 sets the processing target affected area image as a candidate to be stored in association with the processing target patient.

An example where a predetermined condition is a condition that an image capturing time falls in a medical care time period of a patient will now be described. In a case where, from among pieces of data of the patients extracted in step S601, the foremost patient data 514 is read in step S605 as information regarding a zeroth patient, the medical care start time 505 and the medical care end time 506 of the patient data 514 are referred to in step S606. Because the medical care start time 505 of the patient data 514 is "13:10" and the medical care end time 506 is "13:30", three images with the image identification number 401 storing Nos. 2 to 4 are extracted.

In a case where information regarding a patient that indicates the patient data 515, which is the data following the patient data 514, is read in step S605 as information regarding a first patient, the medical care start time 505 and the medical care end time 506 of the patient data 515 are referred to in step S606. Because the medical care start time 505 of the patient data 515 is "13:50" and the medical care end time 506 is "14:15", three images with the image identification number 401 storing Nos. 5, 7, and 8 are extracted. The image with the image identification number 401 storing No. 6 is not determined as a processing target because the image type 402 is "identification".

In step S607, the CPU 201 determines whether the number of images extracted in step S606 is a value greater than 0. In a case where the CPU 201 determines that the number of extracted images is greater than 0 (YES in step S607), the processing proceeds to step S608. In a case where the CPU 201 determines that the number of extracted images is 0 (NO in step S607), the CPU 201 determines that an affected area image associated with the p-th patient has not been found, and the processing proceeds to step S610.

In step S608, the CPU 201 substitutes 0 into a counter k for sequentially performing subsequent processing on the image extracted in step S606.

In step S609, the CPU 201 determines whether the counter k indicates a value less than the number of images extracted in step S606. In a case where the CPU 201 determines that the counter k is less than the number of images extracted in step S606 (YES in step S609), the processing proceeds to step S611. In a case where the CPU 201 determines that the counter k is greater than or equal to the number of images extracted in step S606 (NO in step S609), the CPU 201 determines that the matching of all the extracted affected area images of the p-th patient has been completed, and the processing proceeds to step S610.

In step S610, the CPU 201 updates the processing status 511 of the p-th patient data to "processed". The processing then proceeds to step S614.

In step S611, the CPU 201 performs the matching between information included in the diagnosis and treatment department 507 of the p-th patient data and information included in the imaging apparatus operator department 405 of a k-th affected area image, and determines whether both departments match. In a case where the CPU 201 determines that the departments match (YES in step S611), the CPU 201 determines that the k-th affected area image might be associated with the p-th patient, and the processing proceeds to step S612. In a case where the CPU 201 determines that the departments do not match (NO in step S611), the CPU 201 determines that the k-th affected area image is not associated with the p-th patient, and the processing proceeds to step S615. In the above-described processing, the image management apparatus 106 performs the matching between imaging apparatus operator information of an affected area image and medical information of a patient. In the present exemplary embodiment, the image management apparatus 106 performs the matching between an imaging apparatus operator department of an affected area image and a diagnosis and treatment department visited by a patient. Based on the matching result, the image management apparatus 106 sets a processing target affected area image as a candidate to be stored in association with a processing target patient.

In step S612, the CPU 201 determines whether information included in the imaging apparatus ID 510 of the p-th patient data matches information included in the imaging apparatus ID 406 of the k-th affected area image. In a case where the CPU 201 determines that the imaging apparatus IDs match (YES in step S612), the CPU 201 determines that the k-th affected area image might be associated with the p-th patient, and the processing proceeds to step S613. In a case where the CPU 201 determines that the imaging apparatus IDs do not match (NO in step S612), the CPU 201 determines that the k-th affected area image is not associated with the p-th patient, and the processing proceeds to step S616. In the above-described processing, the image management apparatus 106 performs the matching between imaging apparatus information of an affected area image and imaging apparatus information of an identification image of a patient. In the present exemplary embodiment, the image management apparatus 106 performs the matching between an imaging apparatus ID acquired from an affected area image and an imaging apparatus ID acquired from an identification image. This enables the image management apparatus 106 to use medical information of a patient and imaging apparatus information acquired from an identification image of the patient for the matching. In a case where the matching has failed, the image management apparatus 106 excludes a processing target affected area image from a candidate to be associated with a processing target patient. In steps S611 and S612 described above, the image management apparatus 106 performs the matching between information regarding a predetermined item of image capturing information of an affected area image and information regarding a predetermined item of information regarding an identification image. The condition of association is that pieces of matching target information match.

In step S613, the CPU 201 determines that the k-th affected area image is highly likely to be an affected area image of the p-th patient, and estimates that the k-th affected area image is a target image to be associated with the p-th patient. Specifically, the CPU 201 stores the patient ID 502 of the p-th patient in the estimated patient ID 412 of the k-th affected area image. In the above-described manner, the image management apparatus 106 performs the matching between time information, diagnosis and treatment department information, and imaging apparatus information acquired from an identification image and time information, diagnosis and treatment department information, and imaging apparatus information acquired from an affected area image. Based on matching results of all of these pieces of information, the image management apparatus 106 performs control such that the affected area image is associated with a patient ID of the identification image.

In step S614, the CPU 201 increments the counter p. The processing then returns to step S604. The CPU 201 then repeats the series of processes for all the patients extracted in step S601.

In step S615, because the pieces of information regarding items used for the matching do not match, the CPU 201 determines that the k-th affected area image is not an affected area image of the p-th patient, and stores the mismatched item in the mismatch condition 413 of the k-th affected area image. In the present exemplary embodiment, as information indicating that pieces of diagnosis and treatment department information do not match, the CPU 201 stores "diagnosis and treatment department" in the mismatch condition 413.

In step S616, the CPU 201 stores, as information indicating that pieces of imaging apparatus information do not match, "camera" in the mismatch condition 413. In the above-described processing, the image management apparatus 106 performs the matching between time information, diagnosis and treatment department information, and imaging apparatus information acquired from an identification image and time information, diagnosis and treatment department information, and imaging apparatus information acquired from an affected area image, and in a case where identification of an estimated patient has failed due to a failure in the matching of partial information pieces of these information pieces, the image management apparatus 106 stores the item causing the failure in the matching.

The proceeds to step S617 following the processing in steps S613, S615, or S616.

In step S617, the CPU 201 increments the counter k. The processing then returns to step S609, and the CPU 201 repeats the matching for all the extracted affected area images of the p-th patient.

In step S618, the CPU 201 stores information indicating that the image capturing time 403 falls within medical care time periods of none of patients extracted in step S601 in the mismatch condition 413 of an affected area image with the estimated patient ID 412 including "unknown" and the mismatch condition 413 storing no data. In the present exemplary embodiment, the CPU 201 stores "time" in the mismatch condition 413. The processing of the flowchart then ends.

A specific example of association of a patient and an affected area image will now be described with reference to FIGS. 4 to 7. FIG. 7 illustrates an image list obtained after the association processing in FIG. 6 has executed based on the image list in FIG. 4 and the patient list in FIG. 5. The image list in FIG. 7 stores an execution result of the association processing in FIG. 6. In FIG. 7, a corresponding patient ID is stored in the estimated patient ID 412 as an affected area image where association has been performed by the association processing in FIG. 6. A mismatch item is stored as an affected area image where association has failed in the mismatch condition 413 with "unknown" kept included in estimated patient ID 412.

A case where a patient of the patient data 514 and an affected area image with the image identification number 401 including No. 2 are to be processed will be described as a specific example of a case where a matching result satisfies a predetermined condition will now be described. In this case, in step S611, the CPU 201 performs the matching between the diagnosis and treatment department 507 of the patient data 514 and the imaging apparatus operator department 405 of the affected area image with the image identification number 401 including No. 2. Because both departments correspond to "intraoral surgery", and the departments match, the CPU 201 determines that matching result satisfies the predetermined condition. The affected area image with the image identification number 401 including No. 2 is set as a candidate to be associated with the patient of the patient data 514, and the processing proceeds to step S612. In step S612, the CPU 201 performs the matching between the imaging apparatus ID 510 of the patient data 514 and the imaging apparatus ID 406 of the affected area image with the image identification number 401 including No. 2. Because both imaging apparatus IDs indicate "005" and match, the CPU 201 determines that the matching result satisfies the predetermined condition. The affected area image with the image identification number 401 including No. 2 is kept set as a candidate to be associated with the patient of the patient data 514, and the processing proceeds to step S613. In step S613, the CPU 201 determines that the affected area image with the image identification number 401 including No. 2 is associated with the patient of the patient data 514, and stores "101", which is the patient ID 502 of the patient data 514, in the estimated patient ID 412 of the affected area image with the image identification number 401 including No. 2.

A case where the patient of the patient data 514 and an affected area image with the image identification number 401 including No. 4 are to be processed will not be described as a specific example of a case where the matching has failed due to mismatch of imaging apparatus information. In this case, in step S611, the CPU 201 performs the matching between the diagnosis and treatment department 507 of the patient data 514 and the imaging apparatus operator department 405 of the affected area image with the image identification number 401 including No. 4. Because both departments correspond to "intraoral surgery", and the departments match, the CPU 201 determines that the matching result satisfies the predetermined condition. The affected area image with the image identification number 401 including No. 4 is set as a candidate to be associated with the patient indicated by the patient data 514, and the processing proceeds to step S612. In step S612, the CPU 201 performs the matching between the imaging apparatus ID 510 of the patient data 514 and the imaging apparatus ID 406 of the affected area image with the image identification number 401 including No. 4. Because the imaging apparatus ID 510 is "005" and the imaging apparatus ID 406 is "001", which do not match, the CPU 201 determines that the matching has failed. In step S616, the CPU 201 stores "camera" in the mismatch condition 413 of the affected area image with the image identification number 401 including No. 4. The estimated patient ID 412 of the affected area image with the image identification number 401 including No. 4 is kept to be "unknown".

A case where a patient of the patient data 515 and an affected area image with the image identification number 401 including No. 8 are to be processed will now be described as a specific example of a case where cross-check has failed due to mismatch of diagnosis and treatment department information. In this case, in step S611, the CPU 201 performs the matching between the diagnosis and treatment department 507 of the patient data 515 and the imaging apparatus operator department 405 of the affected area image with the image identification number 401 including No. 8. Because the diagnosis and treatment department 507 is "dentistry" and the imaging apparatus operator department 405 is "intraoral surgery", which do not match, the CPU 201 determines that the matching has failed. Next, in step S615, the CPU 201 stores "diagnosis and treatment department" in the mismatch condition 413 of the affected area image with the image identification number 401 including No. 8. The estimated patient ID 412 of the affected area image with the image identification number 401 including No. 8 is kept to be "unknown".

<UI Screen Representing Correspondence Relationship Between Patient and Affected Area Image>

FIG. 8 illustrates an example of a UI screen representing a correspondence relationship between a patient and an affected area image. In a case where the execution of the association processing in FIG. 6 has completed, the CPU 201 of the image management apparatus 106 performs control to display the UI screen illustrated in FIG. 8 on the display 204 of the image management apparatus 106. On the UI screen illustrated in FIG. 8, images registered in the image registration processing in FIG. 3 are displayed as a list together with an execution result of the association processing in FIG. 6. Based on the image list in FIG. 7 that stores the execution result of the association processing in FIG. 6, the CPU 201 of the image management apparatus 106 performs control to display the UI screen illustrated in FIG. 8. Using the UI screen illustrated in FIG. 8 enables the operator to check and correct an association result.

A transmission button 800 is a display item for issuance of an instruction to transmit an image to the image information DB 110. In a case where the operator has selected the transmission button 800, the CPU 201 transmits an affected area image to the image management system 105 via the network 102 together with, for example, information regarding the affected area image containing corresponding patient ID, image capturing date and time.

A folder selection button 801 is a display item for issuance of a folder selection instruction.

In a case where the operator selects the folder selection button 801, the CPU 201 displays a folder selection dialog on the display 204. In a case where a folder has been selected on the folder selection dialog, the CPU 201 reads an image in the selected folder as a processing target image.

In the present exemplary embodiment, the image registration processing in FIG. 3 has already been executed on the image read as a processing target image.

A text box 802 displays a path to the folder selected on the above-described folder selection dialog.

A matching button 803 is a display item for issuance of an execution instruction of the association processing in FIG. 6. In a case where the operator selects the matching button 803, the CPU 201 executes the association processing in FIG. 6 on an affected area image from among images read as processing target images.

An end button 804 is a display item for issuance of an instruction to close the UI screen illustrated in FIG. 8.

A scroll bar 805 is a display item for issuance of a change instruction of an image display range in a case where a processing target images are not displayed within a screen region. When the operator operates the scroll bar 805, the CPU 201 switches the image display range.

A display region of each image includes an image identification number display region 806 and a thumbnail image display region 807. In the image identification No display region 806, an image identification number of the corresponding image is displayed.

The image identification number corresponds to the image identification number 401 in FIG. 7. In place of an image identification number, a file name that can uniquely identify an image can be displayed. In the thumbnail image display region 807, a reduced image of a corresponding image is displayed.

A display region of an affected area image where a patient has been estimated in the association processing in FIG. 6 includes an estimated patient name display region 808. An image where a patient has been estimated is an image with a patient ID stored in the estimated patient ID 412. In the estimated patient name display region 808, a patient name corresponding to the estimated patient ID 412 of the image is displayed.

A display region of an affected area image where a patient has not been estimated in the association processing in FIG. 6 includes a mismatch condition display region 809 and a candidate display button 810. An image where a patient has not been estimated is an image with the estimated patient ID 412 including "unknown". In mismatch condition display regions 809, 811, and 812, information indicating that identification of a patient to be associated has failed, and items of the mismatch condition 413 of respective images are displayed. In the mismatch condition display region 809, "camera mismatch" is displayed as information indicating that pieces of imaging apparatus information do not match. In the mismatch condition display region 811, "diagnosis and treatment department mismatch" is displayed as information indicating that pieces of diagnosis and treatment department information do not match. In the mismatch condition display region 812, "time mismatch" is displayed as information indicating that pieces of time information do not match. In the above-described processing, the image management apparatus 106 displays information notifying that a patient to be associated with the affected area image has failed to be identified and a cause for the failure in identification of the patient in association with an affected area image failed in the matching in the association processing in FIG. 6. The notification method is not limited to a method of displaying the information and the cause on the display 204, as long as the operator can be notified of the information and the cause.

The candidate display button 810 is a display item for issuance of a display instruction of a patient candidate. In response to the operator selecting the candidate display button 810, the CPU 201 displays as candidates, from among patients with their medical care time periods matching the image capturing time 403 of the affected area image, patients with the diagnosis and treatment department 507 matching the imaging apparatus operator department 405 of the affected area image. Then, in a case where the operator designates a patient from among the candidates, the CPU 201 associates a corresponding image and information regarding the designated patient. More specifically, the CPU 201 stores a patient ID of the designated patient in the estimated patient ID 412 of the image. The CPU 201 can display, as candidates, all patients with medical care time periods matching the image capturing time 403 of the affected area image, and can display, as candidates, all patients with the diagnosis and treatment department 507 matching the imaging apparatus operator department 405 of the affected area image. The notification method is not limited to a method of displaying candidates on the display 204, as long as the operator can be notified of the candidates.

In the above-described processing, an image management apparatus of the present exemplary embodiment performs the matching between image capturing information of a target image and information regarding an identification image of a target person, and based on the matching result, associates the target image and identification information of the target person. With this configuration, even in a case where the target image is recorded without being associated with the identification information of the target person, or even in a case where the order of image capturing of the target image and an image including the identification information of the target person is not uniquely defined, it is possible to prevent the target image and the identification information of the target person from being wrongly associated. Especially in a medical system, even in a case where an affected area image is recorded without being associated with identification information of a patient, or even in a case where an image capturing order of an affected area image and an identification image of a patient is not uniquely defined, it is possible to prevent the affected area image and identification information of the patient from being wrongly associated. In a case where association has failed, by notifying the operator that a corresponding patient is unknown and notifying the operator of an item with information causing the failure in the matching, the operator is notified of a cause of the association failure. In a case where association has failed, candidate display is performed, at an image capturing time of the affected area image, for an affected area image by displaying a patient who has visited the same diagnosis and treatment department as the diagnosis and treatment department indicated by image capturing information of the affected area image. With this configuration, the operator can easily perform association.

According to the image management apparatus of the present exemplary embodiment, unlike an inspection apparatus in which image capturing is performed after the issuance of an order, even in a case where image capturing is performed without an order, the matching can be performed based on actual medical care start time and end time and a diagnosis and treatment department. For example, in a case where a diagnosis and treatment department to be visited is first determined in at a general internal medicine department, the matching can be performed based on information that is based on a past record. In a case where a patient can be identified afterward, such as the case of an emergency department, it becomes possible to associate identification information of a patient afterward.

As a first modified example of the present exemplary embodiment, in place of the method of displaying a list of association execution results of affected area images as in FIG. 8, the operator can manually associate a patient with an affected area image, and the operator can be notified of an affected area image where association might be wrong. In this case, the CPU 201 performs determination whether a patient designated by the operator and a patient estimated in the association processing in FIG. 6 match, and displays information regarding an affected area image failed in the matching on the display 204. The CPU 201 can display a UI for prompting the operator to confirm the patient designated by the operator or change the patient to another patient.

As a second modified example of the present exemplary embodiment, the matching can be performed using an imaging apparatus management department in place of an imaging apparatus ID. With this configuration, even in a case where an imaging apparatus that has captured an identification image and an imaging apparatus that has captured an affected area image are different from each other, the matching can be performed. In this case, the CPU 201 registers an imaging apparatus management department acquired in step S304 of FIG. 3 in the image list in FIG. 4 in place of an imaging apparatus ID. The CPU 201 then performs the matching between imaging apparatus management department information acquired from an affected area image and imaging apparatus management department information acquired from an identification image, and in a case where pieces of matching target information match, sets the affected area image as a candidate to be associated with a patient of the identification image. In a case where a plurality of imaging apparatuses of the same model do not exist in a facility, the matching can be performed using an imaging apparatus model name.

As a third modified example of the present exemplary embodiment, in place of the configuration of acquiring various types of information from the electronic medical chart system 104 in steps S303, S304, and S307 of FIG. 3, a configuration of acquiring various types of information from the HDD 205 of the image management apparatus 106 can be employed. In this case, information in each database is stored in the HDD 205 of the image management apparatus 106.

As a fourth modified example of the present exemplary embodiment, in FIG. 6, the processing in step S612 of the matching between imaging apparatus information of an affected area image and imaging apparatus information of an identification image of a patient can be skipped. In this case, acquisition of imaging apparatus information (imaging apparatus ID) in the processing in step S302 or S304 of FIG. 3 can be skipped. An item related to imaging apparatus information can be omitted from the image list in FIG. 4 and the patient list in FIG. 5. In this case, incorrect association can be reduced by the matching between an image capturing time and a medical care time period and the matching between a department of an imaging apparatus operator who has captured an affected area image and a diagnosis and treatment department visited by a patient.

As a fifth modified example of the present exemplary embodiment, in a case where an imaging apparatus operator of an identification image and an imaging apparatus operator of an affected area image always match, the matching can be performed using an imaging apparatus operator ID. That is, the image management apparatus 106 performs the matching between imaging apparatus operator information of an affected area image and imaging apparatus operator information of an identification image of a patient. Specifically, the CPU 201 performs the matching between information regarding the imaging apparatus operator ID 508 of patient data and information regarding the imaging apparatus operator ID 404 of an affected area image. In a case where pieces of matching target information match, the CPU 201 sets the affected area image as a candidate to be associated with a patient of the identification image.

As a sixth modified example of the present exemplary embodiment, in a case where a department of an imaging apparatus operator of an identification image and a department of an imaging apparatus operator of an affected area image always match, the matching can be performed using a department of an imaging apparatus operator. In the fifth modified example, an imaging apparatus operator ID contained in imaging apparatus operator information is used for the matching. In the sixth modified example, a department of an imaging apparatus operator is used for the matching in place of the imaging apparatus operator ID.

As a seventh modified example of the present exemplary embodiment, in FIG. 6, the processing in step S611 of the matching between imaging apparatus operator information of an affected area image and medical information of a patient can be skipped. In this case, acquisition of imaging apparatus operator information (imaging apparatus operator ID, an imaging apparatus operator department) in the processing in step S302 or S303 of FIG. 3 can be skipped. An item related to imaging apparatus operator information is not required in the image list in FIG. 4 and the patient list in FIG. 5. In this case, incorrect association can be reduced by the matching between an image capturing time and a medical care time period, and the matching between imaging apparatus information of an affected area image and imaging apparatus information of an identification image.

While, in the present exemplary embodiment, a description has been provided using a medical system as an example, an applicable system is not limited to the medical system, and any other type of system, such as a nursing care system or a childcare system, that would enable practice of the present exemplary embodiment is applicable.

An exemplary embodiment of a nursing care system will now be described. In this embodiment the above-described medical information is replaced with nursing care service information. The nursing care service information contains, for example, nursing care target person information, a nursing care service start time, a nursing care service end time, an organization and a department that provide a nursing care service, and service contents. The nursing care target person information contains a nursing care target person ID, and a name, a gender, a birth date, a medical history, and allergy information of a nursing care target person, and a nursing care name. Departments that provide services include a department of rehabilitation and a pressure ulcer care department of a nursing care facility. The service contents include contents of rehabilitation and pressure ulcer care.

An exemplary embodiment of a childcare system will now be described. In this embodiment the above-described medical information is replaced with childcare service information. The childcare service information contains, for example, childcare target person information, a childcare service start time, a childcare service end time, a facility where childcare has been performed, and childcare contents.

The childcare target person information contains a childcare target person ID, and a name, a gender, a birth date, a medical history, and allergy information of a childcare target person, and a guardian name. The facility where childcare is performed includes age-based classes, such as an infant class, and a one-year-old-children class. The childcare contents include, for example, allergy care and dietary education that uses baby food.

By using nursing care service information or childcare service information in the above-described respective exemplary embodiments, an effect similar to the exemplary embodiment of the medical system can be obtained by the matching of service times and departments or facilities provided services.

In a second exemplary embodiment, the description will be given of a method of setting an association rule to be used in association processing of a patient and an affected area image. In the following description, redundant descriptions of components or elements similar to those of the first exemplary embodiment will be omitted.

<Setting Screen of Association Rule>

FIG. 9 illustrates an example of a setting screen of an association rule. The association rule includes a set of information acquired from an affected area image and information acquired from an identification image, a condition of determination to be performed by comparing the pieces of acquired information, and association-related processing to be executed in a case where the condition of determination is satisfied. In response to a display request from the operator, the CPU 201 of the image management apparatus 106 performs control to display the setting screen illustrated in FIG. 9 on the display 204 of the image management apparatus 106.

An end button 901 is a display item for issuance of an instruction to close the setting screen illustrated in FIG. 9.

In a region 930 for setting of information to be acquired from an affected area image to be registered (hereinafter, referred to as registered image information), a type list box 902 and a condition box 903 are provided.

The type list box 902 is used for selection of an item of information to be acquired from an image. In the present exemplary embodiment, any item can be selected from among an image capturing time, an imaging apparatus operator ID, an imaging apparatus operator department, an imaging apparatus operator job, an image capturing apparatus ID, an image capturing apparatus management department, and an image capturing apparatus model name. Examples of an imaging apparatus operator job include a doctor, a nurse, a clerk, or a pharmacist.

The condition box 903 is used for selection of a value of an item selected in the type list box 902. In a case where a specific value is not to be designated, ANY is selected. Based on selection operations performed by the operator in the type list box 902 and the condition box 903, the CPU 201 sets registered image information. In a case where an imaging apparatus operator department and an image capturing apparatus management department are selected in the type list box 902, department names of the facility are listed as candidates. In a case where an imaging apparatus model name is selected in the type list box 902, model names of imaging apparatuses owned by the facility are listed as candidates. The CPU 201 can read information to be listed from information pre-registered in the HDD 205 or can acquire the information from the facility information DB 109 via the network 102.

In a region 931 for setting of medical information to be acquired from an identification image, a type 1 list box 904, an information 1 list box 905, a type 2 list box 906, and an information 2 list box 907 are provided.

The type 1 list box 904 and the type 2 list box 906 are used for selection of an item of medical information to be acquired from an identification image. In the present exemplary embodiment, any item can be selected from among patient information, a medical care start time, a medical care end time, an inspection start time, an inspection end time, a visited diagnosis and treatment department, a position in a body of a past injury or disease, and a diagnosis result.

The information 1 list box 905 is used for selection of a value of an item selected in the type 1 list box 904. In a case where a specific value is not to be designated, ANY is selected. Based on selection operations performed by the operator in the type 1 list box 904 and the information 1 list box 905, the CPU 201 sets first information in medical information.

The information 2 list box 907 is used for selection of a value of an item selected in the type 2 list box 906. In a case where a specific value is not to be designated, ANY is selected. Based on selection operations performed by the operator in the type 2 list box 906 and the information 2 list box 907, the CPU 201 sets second information in medical information.

Candidates from among items selected in the type 1 list box 904 and the type 2 list box 906 are listed similarly to the condition box 903 are candidates of values that are preliminary restricted. The CPU 201 can read information to be listed from information pre-registered in the HDD 205 or can acquire the information from the medical information DB 108 via the network 102.

Radio buttons 908 to 912 are provided in a region 932 for selection of a condition of determination to be performed by comparing registered image information acquired from an affected area image and a first information and a second information acquired from an identification image.

Based on selection of any of the radio buttons 908 to 912, a condition of determination to be performed by comparing the registered image information and the first information and the second information is set. As a default value, the radio button 908 is set to ON, and the radio buttons 909 to 912 are set to OFF. In response to the operator selecting any of the radio buttons 909 to 912, the CPU 201 determines that a determination condition change instruction has been issued, switches the pressed radio button to ON, and switches the other radio buttons to OFF.

In a case where the radio button 908 is set to ON, the CPU 201 sets, as a determination condition, a condition that the registered image information matches the first information.

In a case where the radio button 909 is set to ON, the CPU 201 sets, as a determination condition, a condition that the registered image information is greater than the first information.

In a case where the radio button 910 is set to ON, the CPU 201 sets, as a determination condition, a condition that the registered image information is less than the first information.

In a case where the radio button 911 is set to ON, the CPU 201 sets, as a determination condition, a condition that the registered image information falls between the first information and the second information.

In a case where the radio button 912 is set to ON, the CPU 201 sets processing selected in a region 933 to be executed without comparing the registered image information with the first information and the second information.

In the region 933 for selection of processing to be performed in a case where a determination condition set in the region 932 is satisfied as a result of comparison between the registered image information acquired from the affected area image and the first information and the second information acquired from the identification image, radio buttons 913 to 915 are provided. Processing selectable in the region 933 includes processing related to association between a patient of an identification image from which the first information and the second information are to be acquired and an affected area image from which the registered image information is to be acquired.

Based on selection of any of the radio buttons 913 to 915, processing related to the association is set. As a default value, the radio button 913 is set to ON, and the radio buttons 914 and 915 are set to OFF. In response to the operator selecting any of the radio buttons 914 and 915, the CPU 201 determines that a setting change instruction of the association-related processing has been issued, switches the pressed radio button to ON, and switches the other radio buttons to OFF.

In a case where the radio button 913 is set to ON, the CPU 201 sets the processing to be performed to processing of, in a case where a determination condition selected in the region 932 is satisfied, associating a patient and an affected area image with each other.

In a case where the radio button 914 is set to ON, the CPU 201 sets the processing to be performed to processing of, in a case where a determination condition selected in the region 932 is satisfied, not associating a patient and an affected area image with each other.

In a case where the radio button 915 is set to ON, the CPU 201 sets the processing to be performed to processing of, in a case where a determination condition selected in the region 932 is satisfied, not performing comparison.

In a rule NO box 916, a rule number corresponding to an association rule is displayed.

A rule addition button 917 is a display item for issuance of a rule addition instruction. In response to the operator selecting the rule addition button 917, the CPU 201 checks that an association rule designated by the operator includes no theoretical failure, and stores the designated association rule into the RAM 203. Examples of the theoretical failure include a case where a condition of a magnitude relation is selected for an item with a value in non-number form, and a case where, even though "between information 1 and information 2" is selected as a determination condition, registered image information that can fall between the information 1 and the information 2 is not set. Then, in response to the operator selecting the end button 901, the CPU 201 allocates a rule number to an association rule stored in the RAM 203, and stores the association rule into the HDD 205. A rule set in the above-described manner is called an existing rule. A plurality of existing rules are stored in the HDD 205.

An edit button 918 is a display item for issuance of a change instruction of an existing rule. In response to the operator selecting the edit button 918, the CPU 201 reads an existing rule from the HDD 205 and stores it in the RAM 203. Existing rules are displayed in a priority order list 920. In a default setting, a rule displayed at the top of the priority order list 920 is selected.

A deletion button 919 is a display item for issuance of a deletion instruction of an existing rule. In a case where the operator selects the deletion button 919, the CPU 201 deletes the selected existing rule from the HDD 205.

A plurality of set existing rules are displayed in the priority order list 920. In the priority order list 920, a rule number display region 921 and a rule information display region 922 are provided for each rule. In the rule number display region 921, a rule number allocated to a rule when the rule is added is displayed. In the rule information display region 922, information regarding an association rule is briefly displayed.

A rule displayed at a higher position in the priority order list 920 has a higher priority order and a rule displayed at a lower position in the priority order list 920 has a lower priority order. The CPU 201 sequentially executes association-related processing that is based on an existing rule in order of the priority order. All the rules in the priority order list 920 are executed such that association processing of an affected area image not targeted in the rule with the first priority order is performed based on the rule with the second priority order. In the present exemplary embodiment, determination results of the respective rules are used as an OR condition, but the determination results of the respective rules can be used as an AND condition. The OR condition, the AND condition, or a NOT condition can be made selectable for each rule.

An upward change button 924 is a display item for issuance of an instruction to change a priority order of a rule selected in the priority order list 920 to a higher order. In response to the operator selecting the upward change button 924, the CPU 201 changes the orders between the selected rule and a rule placed immediately above the selected rule.

A downward change button 925 is a display item for issuance of an instruction to change a priority order of a rule selected in the priority order list 920 to a lower order. In response to the operator selecting the downward change button 925, the CPU 201 changes the orders between the selected rule and a rule placed immediately below the selected rule.

In the above-described processing, the CPU 201 sets a priority order of an existing rule based on an operation performed by the operator.

In the present exemplary embodiment, in place of the processing in steps S611 to S612 of FIG. 6, the CPU 201 executes determination processing using a determination condition of an existing rule. In step S613, the CPU 201, based on an existing rule, selectively executes processing of associating a patient and an affected area image, or processing of not associating a patient and an affected area image. While a preset fixed condition is used as an association condition in the first exemplary embodiment, in the present exemplary embodiment, various conditions based on the relation between information acquired from an affected area image and information acquired from an identification image can be used. With this configuration, association processing can be performed using a method suitable for the situation of each facility.

For example, in a case where an imaging apparatus operator department is an emergency department, because the emergency department is not prepared as a value selectable as a diagnosis and treatment department in medical information, processing of not associating a patient and an affected area image can be set. In this case, an imaging apparatus operator department is designated in the type list box 902 and an emergency department is designated in the condition box 903. Then, a rule set by setting the radio button 912 to ON and setting the radio button 914 to ON is registered as a topmost rule in the priority order list 920. Alternatively, a rule of not using an imaging apparatus operator department in the matching in a case where the imaging apparatus operator department is the emergency department can be set.

For example, a condition that an image capturing time falls between a medical care start time and a medical care end time is set as an association condition in the first exemplary embodiment. In the present exemplary embodiment, a condition that an image capturing time falls between an inspection start time and an inspection end time can also be set as an association condition. In this case, an image capturing time is designated in the type list box 902, ANY is designated in the condition box 903, an inspection start time is designated in the type 1 list box 904, an inspection end time is designated in the type 2 list box 906, and ANY is designated in the information 1 list box 905 and the information 2 list box 907. Then, the radio button 911 is set to ON and the radio button 913 is set to ON. With this configuration, in a case where image capturing is performed during an inspection time, in place of the matching between an image capturing time and a medical care time period, it becomes possible to perform the matching between an image capturing time and an inspection time period.

For example, a condition that an imaging apparatus operator department and a diagnosis and treatment department match is set as an association condition in the first exemplary embodiment. In the present exemplary embodiment, in consideration of a case where an imaging apparatus operator captures images of patients of a plurality of diagnosis and treatment departments, the setting can be made such that an imaging apparatus operator department can be associated with the plurality of diagnosis and treatment departments.

A description will now be provided of a setting method for performing association with whichever department of a dentistry or an intraoral surgery using a specific example case of an imaging apparatus operator working for both the dentistry and the intraoral surgery. In this case, first to third rules are set as described below.

First, a setting method of the first rule as follows. A department of an imaging apparatus operator is designated in the type list box 902 and intraoral surgery is designated in the condition box 903. A diagnosis and treatment department is designated in the type 1 list box 904 and dentistry is designated in the information 1 list box 905. The radio button 908 is set to ON and the radio button 913 is set to ON.

Next, a setting method of the second rule will be described. An imaging apparatus operator department is designated in the type list box 902 and dentistry is designated in the condition box 903. A diagnosis and treatment department is designated in the type 1 list box 904 and intraoral surgery is designated in the information 1 list box 905. The radio button 908 is set to ON and the radio button 913 is set to ON.

Lastly, a setting method of the third rule will be described below. An imaging apparatus operator department is designated in the type list box 902, ANY is designated in the condition box 903, a diagnosis and treatment department is designated in the type 1 list box 904, and ANY is designated in the information 1 list box 905. The radio button 908 is set to ON and the radio button 913 is set to ON.

Using the rules set as described above, even in a case where an imaging apparatus operator captures images of patients of a plurality of diagnosis and treatment departments, enables performance of appropriate association.

In the present exemplary embodiment, it is possible to set a priority order to an existing rule. With this configuration, the CPU 201, based on the set priority order, can sequentially execute association-related processing that is based on an existing rule. In other words, the CPU 201 performs control to perform association-related processing preferentially using a result of determination processing based on a rule having a higher priority order over a result of determination processing based on a rule having a lower priority order. For example, a priority order of the matching that uses an image capturing time and an imaging apparatus operator department is set to a higher priority order, and a priority order of the matching that uses imaging apparatus information is set to a lower priority order. An imaging apparatus operator can be made usable in the matching regardless of whether a job of an imaging apparatus operator is doctor or nurse, or an imaging apparatus operator department can be made usable in the matching only in a case where a job of an imaging apparatus operator is doctor.

According to the above-described image management apparatus of the present exemplary embodiment, a condition to be used in the matching can be changed based on the circumstances of a hospital and a diagnosis and treatment department. By setting an association rule using a method similar to the above-described method in workplaces other than a medical workplace, such as a nursing care workplace or a childcare workplace, it becomes possible to perform appropriate association in accordance with the circumstances of each workplace.

Other Exemplary Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that these embodiments are not seen to be limiting. The scope of the following claims is to be accorded the broadest interpretation so as to encompass all such modifications and equivalent structures and functions.

This application claims the benefit of Japanese Patent Application No. 2022-073358, filed Apr. 27, 2022, which is hereby incorporated by reference herein in its entirety.

What is claimed is:

1. An information processing apparatus comprising:
one or more memories; and
one or more processors in communication with the one or more memories, wherein the one or more processors and the one or more memories are configured to:
acquire a plurality of images including one or more affected area images and one or more identification images different from the one or more affected area images, each image of the plurality of images including image information;
analyze the plurality of images to extract an identification image corresponding to a target person who receives a service;
acquire from the identification image, identification information to identify the target person corresponding to the identification image;
acquire, based on the image information of each image of the plurality of images, image capturing information of each image of the plurality of images;
acquire, based on the identification information acquired from the identification image, service information regarding a service received by the target person identified by the identification information;

perform matching between the image capturing information of a target affected area image and the service information; and control, based on a result of the matching, storage of the identification information in association with the target affected area images, wherein prior to performing the matching, identification information is not stored in association with the target affected area image.

2. The information processing apparatus according to claim 1, wherein the matching further includes matching between the image capturing information of the target affected area image and the image capturing information of the identification image.

3. The information processing apparatus according to claim 2, wherein the image capturing information of the target affected area image and the image capturing information of the identification image each includes at least one piece of information of imaging apparatus operator information or imaging apparatus information.

4. The information processing apparatus according to claim 1, wherein, in a case where the result of the matching indicates a match between pieces of the image capturing information of the target affected area image and pieces of the service information, the identification information is stored in association with the target affected area image.

5. The information processing apparatus according to claim 1,
wherein a result of the matching includes a result of matching between information regarding a plurality of predetermined items contained in the image capturing information of the target affected area image and information regarding a plurality of predetermined items contained in the service information, and
wherein, in a case where the matching results in a predetermined condition being satisfied for all items of the pluralities of predetermined items, the identification information is stored in association with the target affected area image.

6. The information processing apparatus according to claim 1, wherein the one or more processors and the one or more memories are further configured to perform control to issue a notification in a case where identification information to be stored in association with the target affected area image has failed to be identified as a result of the matching.

7. The information processing apparatus according to claim 1, wherein the one or more processors and the one or more memories are further configured to perform control to issue a notification indicating a candidate target person identified by identification information to be stored in association with the target affected area image in a case where identification information to be stored in association with the target affected area image has failed to be identified as a result of the matching.

8. The information processing apparatus according to claim 7, wherein a target person with a service receiving time period that includes an image capturing time of the target affected area image is indicated as the candidate.

9. The information processing apparatus according to claim 7, wherein a target person with a service receiving department matching an imaging apparatus operator department indicated by the image capturing information of the target affected area image is indicated as the candidate.

10. The information processing apparatus according to claim 1, wherein a result of the matching includes a result of matching between an image capturing time indicated by the image capturing information of the target affected area image and information regarding a service receiving time of the target person indicated by the service information.

11. The information processing apparatus according to claim 1, wherein a result of the matching includes a result of matching between an imaging apparatus operator department indicated by the image capturing information of the target affected area image and a service receiving department of the target person indicated by the service information.

12. The information processing apparatus according to claim 1,
wherein the acquired image capturing information of an image includes an image capturing time, and
wherein service information corresponding to an identification image having an image capturing time that is within a predetermined service receiving time period is acquired.

13. The information processing apparatus according to claim 1, wherein the one or more processors and the one or more memories are further configured to select information to be used for matching from among image capturing information acquired from the target affected area image and image capturing information acquired from the identification image.

14. An information processing method comprising:
acquiring a plurality of images including one or more affected area images and one or more identification images different from the one or more affected area images, each image of the plurality of images including image information;
analyzing the plurality of images to extracting an identification image corresponding to a target person who receives a service;
acquiring from the identification image, identification information to identify the target person corresponding to the identification image;
acquiring, based on the image information of each image of the plurality of images, image capturing information of each image of the plurality of images;
acquiring, based on the identification information acquired from the identification image, service information regarding a service received by the target person identified by the identification information;
performing matching between the image capturing information of a target affected area image and the service information; and
controlling, based on a result of the matching, storage of the identification information in association with the target affected area image,
wherein prior to performing the matching, the identification information is not stored in association with the target affected area image.

15. A non-transitory computer-readable storage medium storing a program that, when executed by a processor, causes the processor to perform operations comprising:
acquiring a plurality of images including one or more affected area images and one or more identification images different from the one or more affected area images, each image of the plurality of images including image information;
analyzing the plurality of images to extract an identification image corresponding to a target person who receives a service;

acquiring from the extracted identification image, identification information to identify the target person corresponding to the extracted identification image;
acquiring, based on the image information of each image of the plurality of images, image capturing information of each image of the plurality of images;
acquiring, based on the identification information acquired from the identification image, service information regarding a service received by the target person identified by the identification information;
performing matching between the image capturing information of a target affected area image and the service information; and
controlling, based on a result of the matching, storage of the identification information in association with the target affected area images,
wherein prior to performing the matching, the identification information is not stored in association with the target affected area image.

* * * * *